United States Patent [19]

Florer et al.

[11] 4,180,184

[45] Dec. 25, 1979

[54] FERTILIZER SPREADER

[75] Inventors: Richard H. Florer; Thomas E. Via; James M. Weaver, all of Greenville, Ohio

[73] Assignee: Lambert Corporation, Dayton, Ohio

[21] Appl. No.: 891,064

[22] Filed: Mar. 29, 1978

[51] Int. Cl.² ............................................. A01C 15/06
[52] U.S. Cl. ..................................... 222/41; 222/625; 222/473
[58] Field of Search ............................. 222/31, 45–48, 222/624, 625, 473, 472, 474, 41; 74/501 R; 56/16.8; D15/13, 18; 172/364; 404/131

[56] References Cited

U.S. PATENT DOCUMENTS

| | | | |
|---|---|---|---|
| 2,678,145 | 5/1954 | Juzwiak et al. | 222/625 X |
| 2,817,457 | 12/1957 | Liljenberg | 222/625 X |
| 2,817,460 | 12/1957 | Bond | 222/473 X |
| 2,840,271 | 6/1958 | Liljenberg | 222/625 X |
| 4,121,733 | 10/1978 | McRoskey et al. | 222/625 X |

OTHER PUBLICATIONS

Ortho Broadcast Lawn Spreader Model 4000; Owner's Manual Bearing Code "5-76"; Chevron Chemical Comp.; San Francisco, California.

*Primary Examiner*—Charles A. Marmor
*Attorney, Agent, or Firm*—Biebel, French & Nauman

[57] ABSTRACT

A drop type spreader for handling fertilizer, grass seed or the like for lawns and residential use has a flow control hand grip lever positioned at the spreader handles. The lever is gripped together with one of the handles for initiating flow, and the flow control gate and the lever automatically return to cut off the flow when the lever is released. A tension spring is connected between the hopper and the flow control gate for returning the gate to the flow blocking position when the lever is released. The rate of flow is also controlled from the lever by an adjusting screw, and an indicator is provided at the lever for indicating the selected rate of flow.

4 Claims, 6 Drawing Figures

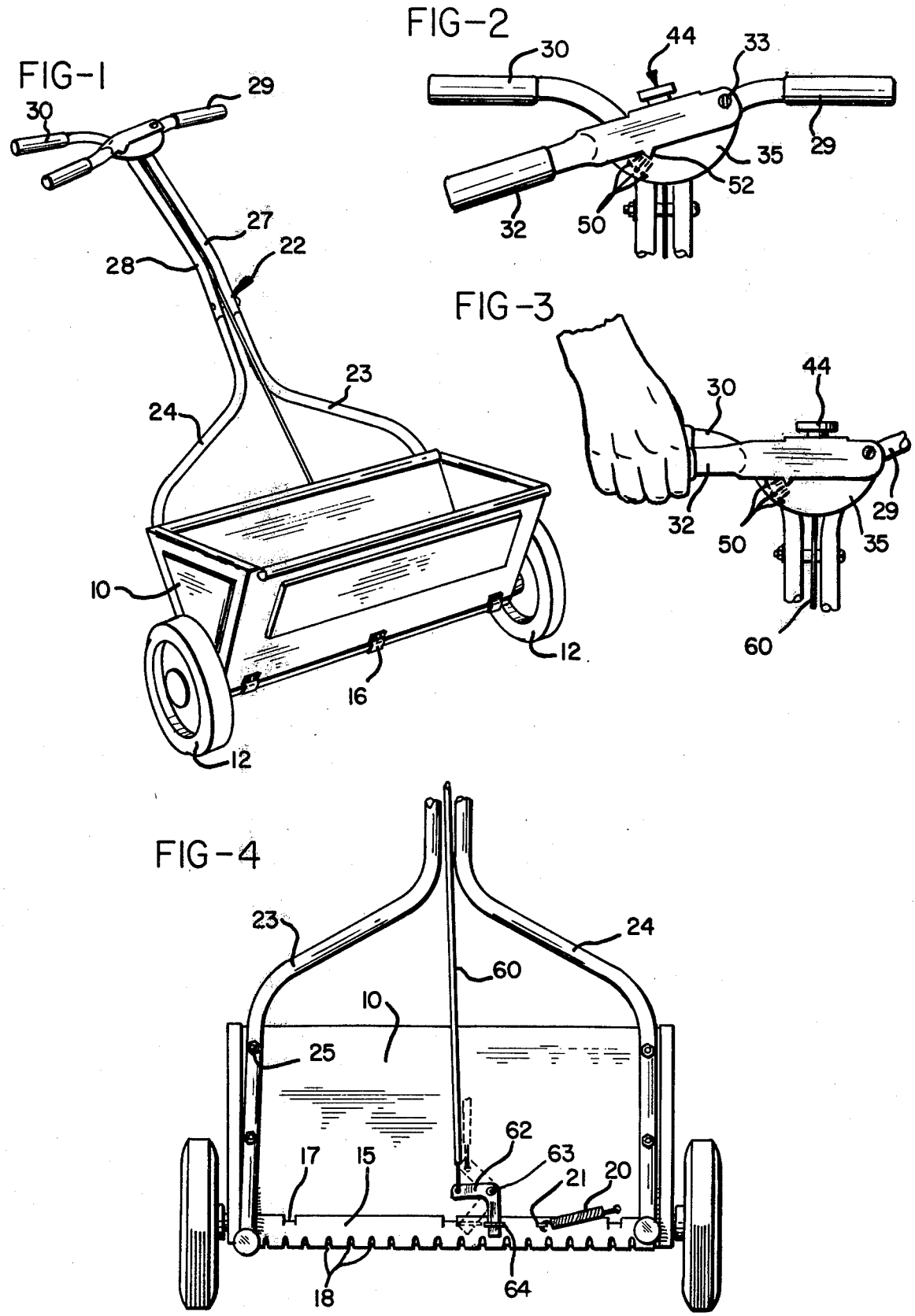

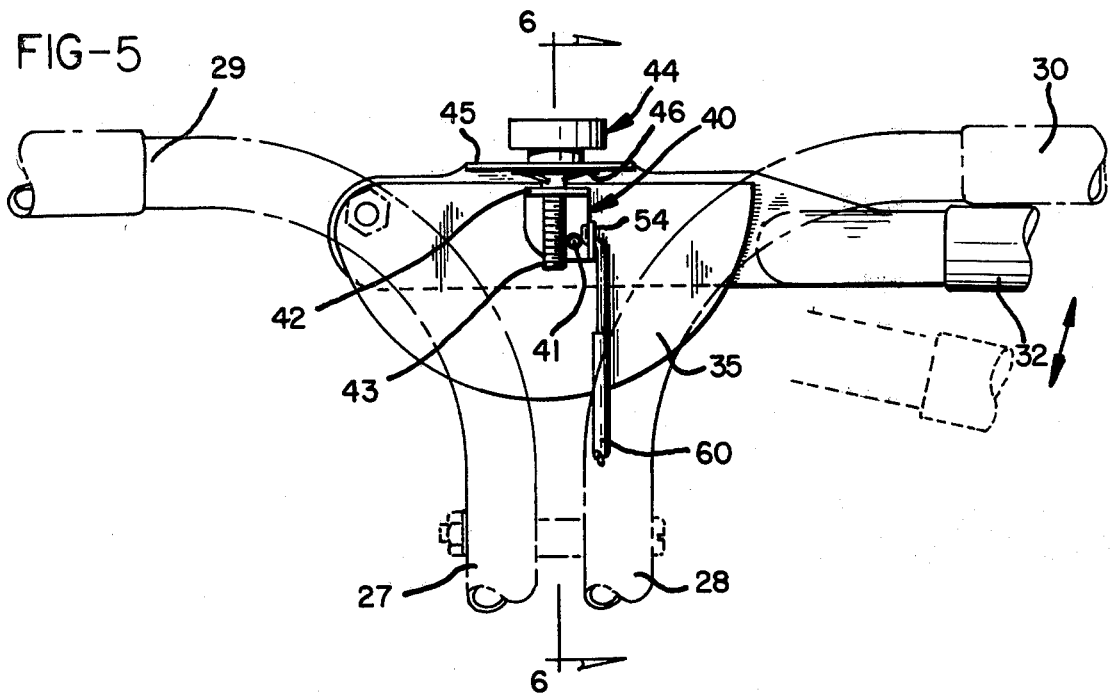
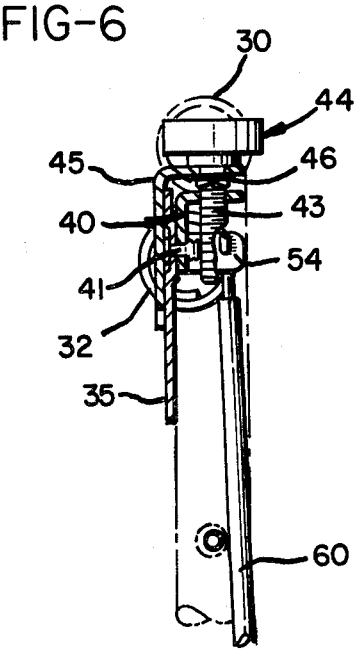

FERTILIZER SPREADER

BACKGROUND OF THE INVENTION

This invention relates to the general field of small hand operated drop type fertilizer and seed spreaders and the like for home and residential use.

Commonly, drop type dry particulate material spreaders for home use are provided with fittings or adjustments on the hopper by which the rate of flow from the spreader hopper may be controlled. There have also been provided on/off control levers either mounted on the hopper itself, or mounted between the handle bars, by which the flow control gate may be manually opened or closed, as desired. In such prior arrangements, the control lever is manually moved to an open position, and when the spreader is stopped, it must be moved to the closed position to prevent the material within the hopper from falling or piling up on the ground. When spreading fertilizer such a pile-up can form a burn spot in the grass. Such prior spreaders lack the convenience of flow-rate control of the handle, and are not provided with an automatic shut-off feature.

SUMMARY OF THE INVENTION

The present invention is directed to an improved drop type spreader in which the on/off control of the gate and of the flow rate are provided at the spreader push handles. An operating mechanism is provided at the handles through which, by simply squeezing a spreader operating lever together with one of the handles, the desired rate of flow is established. The release of the operating lever, by simply releasing the grip thereof, automatically closes the gate and prevents further flow of material from the hopper.

It is accordingly an important object of the invention to provide a hand operated drop type spreader having an automatic shut-off flow, hand-operated mechanism in which the flow control gate is operated at the spreader handles.

A further object of the invention is to provide a drop type spreader in which the control of the flow rate is adjusted by means of an adjustment positioned directly at the handles of the spreader and incorporating and forming a part of a gate control operator also located at the handles.

A still further object of the invention is the provision of a drop type spreader in which a flow control gate is spring biased to its closed position, and which is opened by a squeeze lever arrangement incorporated in or forming a part of the spreader handles, in which the flow control gate is automatically closed under the influence of a spring bias when the handle grip is released.

A still further object of the invention is the provision of an automatic flow control arrangement for a fertilizer spreader or the like in which a hand grip is provided with a squeeze lever to operate the flow control gate and in which the rate of flow is adjusted and the rate established by means of an adjusting screw which adjustably couples the handle to a pull rod, with the relative rate of flow being read on a guide plate underlying the squeeze handle.

These and other objects and advantages of the invention will be apparent from the following description, the accompanying drawings and the appended claims.

BRIEF DESCRIPTION OF THE DRAWINGS

FIG. 1 is a perspective view of the fertilizer spreader of this invention;

FIG. 2 is a fragmentary elevation of the hand operating lever and push handle arrangement in the released position;

FIG. 3 shows the operating lever in the open or actuated position;

FIG. 4 is an elevational view of the back side of the spreader hopper showing the means in which the control wire is connected to actuate the spreader gate;

FIG. 5 is an enlarged elevational view, partially broken away, looking at the back side of the spreader handle and flow control lever arrangement; and FIG. 6 is a fragmentary section taken generally along the line 6—6 of FIG. 5.

DESCRIPTION OF THE PREFERRED EMBODIMENT

An automatic drop spreader according to the invention is illustrated in FIG. 1 as including a generally open top V-shaped hopper 10 of generally conventional construction. The hopper 10 rotatably supports wheels 12 at the ends thereof. Interconnecting within the hopper with at least one of the wheels is a conventional agitator blade (not shown).

The hopper is provided at its bottom with a slotted sheet metal shutter or gate 15 as seen in FIG. 4. The gate 15 may be substantially U-shaped in cross section so as to fit snugly adjacent the curved bottom of the hopper. The gate 15 is retained in the front under a plurality of transversely spaced clips 16, as shown in FIG. 1. In the back, the gate 15 is provided with lanced tongues 17 which are received within suitable slots formed in the hopper. The clips 16 and tongues 17 provide guide means by which the gate 15 is conventionally guided for transverse opening and closing movement with respect to the bottom of the hopper 10. The gate 15 is conventionally slotted as indicated by the slots 18 in FIG. 4 and selectively covers and uncovers openings formed in the hopper bottom. Thus, the gate 15 is normally movable between a normally closed position and selected open positions, through which the rate of flow from the hopper may be controlled.

Means for biasing the gate 15 in a normally closed or shut position includes a coil tension spring 20 having one end mounted or looped in a tab 21 formed on the shutter and having its other end attached to the hopper body. The spring 20 is chosen to have sufficient tension so as to bias the hopper gate 15 to the closed position whenever the operating mechanism, hereinafter described, is manually released.

Means for moving the hopper along the ground on the wheels 12 include a handle assembly illustrated generally at 22 in FIG. 1. The handle assembly includes a pair of lower handle tubes 23 and 24, the lower ends of which are secured by bolts 25 to the back surface of the hopper 10. The lower handle tubes are brought together in generally parallel relation and join with interfitting upper handle tubes 27 and 28. The upper handle tubes terminate respectively in outwardly turned handle grips 29 and 30.

Flow control hand grip or lever means for controlling the flow of the spreader includes an elongated operating lever 32 pivotally mounted by a bolt 33 to the handle 29, as shown in FIGS. 2 and 5. The operating lever 32 extends generally transversely to a position normally somewhat forward of the handle 30, as shown in FIG. 2, and has a length so that it extends to about the same width as that of the handle 30. When the operating lever 32 and handle 30 are gripped, as shown in FIG. 3, the lever 32 is brought to a position in which it is in abutting contact with the surface of the handle 30, as also shown in the full lines in FIG. 5. Thus the lever 32 may be conveniently held together against the handle 30 by gripping them together, when operating the spreader. When the operating lever 32 is released, it returns to the position as shown in FIG. 2, and as shown by the broken or outline view in FIG. 5.

Means for selectively coupling the operating lever 32 to the gate 15 include a generally arcuately shaped dial or guide plate 35 formed of sheet metal and pivoted on the pivot bolt 33 in common with the handle 32. A portion of the plate 35 extends under the handle 32. The plate 35 has riveted to its undersurface a small connecting lever 40, as shown in FIG. 5. The connecting lever 40 is pivotally supported on the plate 35 by a pop rivet 41. The connecting lever 40 has a first upwardly extending threaded tab portion 42 which receives the threaded portion 43 of an adjusting screw 44. The screw 44 extends through a slotted opening in a downwardly turned screw support portion 45 of the handle 32, and is retained assembled on the portion 45 by a conventional sheet metal fastener 46. The screw 44 may thus be adjusted to vary the coupling between the handle 32 on the one hand and the lever 40 and the attached guide plate on the other hand.

The upper surface of the guide plate 35 may be provided with index numerals as indicated at 50 in FIG. 2. The movement of the adjusting screw 44 varies the portion of the upper surface of the guide plate 35 which is exposed from beneath the handle 32. The handle 32 may be provided with a pointer 52 which cooperates with the index numerals 50 by means of which a desired adjustment of the spreading rate may be achieved.

The lever 40 is provided with a second upwardly bent tab portion 54 in right angled relation to the first tab portion 42. The tab portion 54 receives the upper end of a control wire 60. The lower end of the wire 60 is attached to one arm of a gate operator in the form of an L-shaped bell crank 62 as shown in FIG. 4. The bell crank 62 is pivotally attached by a bolt 63 to a hopper 10 and has a lower right-angled arm received within a slotted tab 64 forming part of the gate 15. Rocking movement of the bell crank 62 about its pivot bolt 63 causes the gate 15 to move from the normally closed position to the open position, and this moved position of the bell crank 62 is shown by the broken line view in FIG. 4. This actuating movement of the bell crank, to cause the gate 15 to move between the closed and selected open positions, is accomplished by simply squeezing together the operating lever 32 with the handle 30, as shown in FIG. 3. When the lever 32 is released, the gate 15 is automatically returned to its closed position by means of the bias spring 20.

The rate of flow is adjusted by rotating the screw 44 while observing the relative position of the pointer 52 with respect to the index 50 on the guide plate 35, as best seen in FIG. 2, and when the operating lever 32 is brought into abutment with the handle 30 the desired rate of flow is automatically achieved.

It is thus seen that a simplified and convenient automatic hand control is provided for a drop type spreader, in which a hand grip type of operating lever 32 is provided with a guide plate 35 and an adjusting screw 44, by means of which the flow control settings may be made directly at the push handles 30 and 29 of the spreader. Each time the operating lever 32 is squeezed into engagement with the handle 30, the desired flow setting is achieved, by a corresponding pulling by the control wire 60 to rotate the bell crank 62. The extent of pull on the wire 60 and the extent to which the gate 15 is open is controlled by the relative coupling between the lever 32 and the guide plate 35, and this is controlled by the adjustment of the screw 44. When the operating lever 32 is released, it assumes the position shown in FIG. 2 and the gate 15 is automatically returned to its closed position to prevent unwanted dropping or flow through the gate of the material within the hopper.

While the form of apparatus herein described constitutes a preferred embodiment of this invention, it is to be understood that the invention is not limited to this precise form of apparatus, and that changes may be made therein without departing from the scope of the invention.

What is claimed is:

1. A hand operated drop-type spreader comprising:
   a hopper for containing a quantity of fertilizer or the like,
   a transversely movable flow control shut-off gate mounted at the bottom of said hopper for controlling the flow therefrom and movable between open and closed positions,
   return spring means connected between said hopper and said gate and urging said gate to its closed position,
   a gate operator lever engaged with said gate and effective to open said gate against the force of said spring means,
   rearwardly extending handle means connected to said hopper for movement of the same along the ground, said handle means including a pair of outwardly extending handles at the terminal end thereof,
   a flow control hand grip lever pivotally mounted at one of said handles and extending transversely to a normal position forwardly and spaced from the other of said handles,
   an operator wire interconnecting said hand grip lever and said gate operator lever by means of which said gate may be opened when said hand grip lever is pivoted, said hand grip lever and said other handle being adapted to be grasped by hand simultaneously and brought into abutting contact with each other to open said gate, said hand grip lever automatically returning to its position in spaced relation to said other handle when released, the release of said hand grip lever providing for automatic closure of said gate under the influence of said spring means, and
   adjustable screw means coupling said hand grip lever to said wire including a marked semi-circular dial positioned in partially underlying relation to said hand grip lever and movable by said screw means to indicate the relative flow rate of said spreader when said hand grip lever is moved into abutting contact with said other handle.

2. In a hand operated push-type fertilizer spreader which includes a wheeled hopper adapted to contain a quantity of fertilizer or the like for movement across the ground by means of a rearwardly extending handle, in which the rate of flow from the hopper is controlled by a shut-off and metering gate which is mounted at the bottom of the hopper and movable between a closed position and selected opened positions, and in which said handle terminates in a pair of outwardly extending hand grips, the improvement in control lever and flow indicating means comprising an operator lever pivoted on said handle and extending transversely to a position in normally forwardly inclined relation to one of said hand grips so that said one grip and lever may be grasped in common and squeezed together in abutment with each other, and metering means connecting said lever to operate said gate including a pull wire having one end connected in operative relation to said gate, an indicator dial pivoted on said lever, means connecting said pull wire to said dial, and adjustable coupling means connecting said dial to said lever whereby movement of said lever into abutment with said one grip causes a selective opening movement of said gate by said pull wire.

3. The spreader of claim 2 in which said dial is provided with markings on an upper surface thereof corresponding to desired preselected flow rates, and a portion of said dial is received in underlying relation to said lever so that an exposed portion of the dial may be read by the user to indicate the preselected flow rate.

4. A hand operated fertilizer spreader including a wheeled hopper which is adapted to contain dry fertilizer or the like, a movable flow control gate at the bottom of the hopper for controlling the flow therefrom and movable between open and closed positions, a return spring normally urging the gate into its closed position, and a rearwardly extending handle which is connected to the hopper for movement of the same along the ground terminating in a pair of outwardly directed handles at the terminal end thereof, the improvement comprising an operating lever mounted in pivotal relation to one of said handles and extending transversely into a normally forward position with respect to the other of said handles and adapted to be grasped by hand and brought into abutting contact with said other handle, operator wire means connected to operate said gate by means of which the gate may be selectively opened, flow control adjustment means including a semi-circular dial having flow markings thereof and mounted in at least partially underlying relation to said lever and pivoted in common with said lever on said one handle with a portion of said dial markings being exposed for viewing, means connecting one end of said wire means to said dial, and adjustable means coupling said lever to said dial whereby an operator may preselect a desired flow rate while viewing the same on said dial.

* * * * *